United States Patent [19]

Ebata et al.

[11] Patent Number: 4,486,257

[45] Date of Patent: Dec. 4, 1984

[54] ADHESIVE FOR AND METHOD FOR ADHESION OF CERAMIC ARTICLES

[75] Inventors: Yoshihiro Ebata, Kawanishi; Saburo Kose, Ikeda; Makoto Kinoshita, Ikeda; Tsutomu Ueno, Ikeda, all of Japan

[73] Assignees: Agency of Industrial Science & Technology; Ministry of International Trade & Industry, both of Tokyo, Japan

[21] Appl. No.: 415,476

[22] Filed: Sep. 7, 1982

[30] Foreign Application Priority Data

Dec. 2, 1981 [JP] Japan ................................ 56-194867

[51] Int. Cl.$^3$ .............................................. C09J 1/00
[52] U.S. Cl. ........................................ 156/325; 65/23; 65/43; 106/1.25; 106/286.6; 106/286.7; 156/89; 156/155; 156/283; 156/629; 428/446; 428/688; 428/689; 428/697; 428/698; 428/702; 501/144; 501/151

[58] Field of Search ................ 156/89, 325, 155, 629, 156/283; 501/144, 151; 106/1.25, 286.6, 286.7; 65/23, 43; 428/446, 697, 688, 698, 689, 702, 307.7, 312.6, 317.7, 539.5; 29/423, 424

[56] References Cited

U.S. PATENT DOCUMENTS

| | | | |
|---|---|---|---|
| 2,548,344 | 4/1951 | Buerger et al. | 428/689 |
| 3,189,512 | 6/1965 | Stong | 156/325 |
| 3,325,266 | 6/1967 | Stong | 156/89 |
| 3,331,731 | 7/1967 | Bååk | 428/697 |
| 4,055,451 | 10/1977 | Cockbain et al. | 428/698 |

*Primary Examiner*—John J. Gallagher
*Attorney, Agent, or Firm*—Kurt Kelman

[57] ABSTRACT

A composition of at least one member selected from the group consisting of sodium fluoride and calcium fluoride and optionally containing kaolin is powerful adhesive for ceramic articles which is used by interposing the adhesive intimately between the opposed surfaces for union of the ceramic articles and heating the adhesive to a temperature equal to or higher than the decomposition temperature of the fluoride used.

2 Claims, No Drawings

ADHESIVE FOR AND METHOD FOR ADHESION OF CERAMIC ARTICLES

BACKGROUND OF THE INVENTION

This invention relates to an adhesive for ceramic articles and to a method for the adhesion of such articles, and more particularly to an adhesive advantageously useful for mutual adhesion of ceramic articles of nonoxide type materials such as silicon nitride, silicon carbide, and sialon or for adhesion of ceramic articles of such nonoxide type materials to ceramic articles of other materials and to a method for the adhesion of such articles.

Ceramic articles of nonoxide type materials such as silicon carbide, silicon nitride, and sialon excel particularly in strength at elevated temperatures, resistance to thermal shocks, and resistance to chemicals. By reason of these outstanding properties, they have come to attract keen attention as new high-temperature refractories dissimilar to ceramic articles of metal oxide type materials. Efforts are being continued for the development of new uses for the ceramic articles in various fields. For example, studies are being made to explore the feasibility of these ceramic materials in applications to high-temperature machines and implements, high-precision machine parts, heat exchangers, etc., to ceramic parts destined to be heated instantaneously to high temperatures, and to special high-temperature insulators.

For the ceramic articles of such nonoxide type materials to be advantageously utilized and enabled to manifest their characteristic properties to a full extent while in use, it is often necessary that their mutual adhesion or their adhesion to some other materials should be made while various machines and instruments and their parts which use such ceramic particles are in the course of fabrication. Development of a technique which provides ready and perfect adhesion even for ceramic articles of nonoxide type material finished in various shapes, therefore, is an indispensable requirement.

The ceramic articles of nonoxide type materials, however, have very poor affinity or wetting property generally for molten materials and, unlike the ceramic articles of metal oxide type materials such as alumina and magnesia, show a strong covalent bond property, offer very low reactivity with other chemicals and, moreover, possess a very small thermal expansion coefficient which is less than half the thermal expansion coefficient of alumina. Owing to these unfavorable attributes, adhesion of such articles is extremely difficult. In fact, the adhesion of ceramic articles of nonoxide type materials used to be performed solely by the hot press process involving application of very high levels of temperature and pressure until the methods described afterwards were introduced to the art. Since the hot press process must be operated under high temperature and high pressure, it can provide effective adhesion for ceramic articles of large sizes and complicated shapes only with extreme difficulty. Even if their adhesion is obtained, the adhesive strength with which they are held together is not entirely sufficient.

Recently, an invention was perfected by some of the inventors of the present invention. This has been granted patent under U.S. Pat. Nos. 4,163,074 and 4,269,641 and is covered by Japanese patent application No. SHO 56(1981)-131683 (U.S. patent application Ser. No. 407,352).

U.S. Pat. No. 4,163,074 discloses a method which provides mutual adhesion of nitride ceramic articles by the steps of interposing a mixture of copper sulfide with kaolin intimately between the nitride ceramic articles, heating the joined nitride ceramic articles in a nitrogen-containing atmosphere, then overcoating the thermally treated ceramic articles with silver carbonate, and again heating them in a nitrogen-containing atmosphere.

U.S. Pat. No. 4,269,641 discloses a method for adhesion of two ceramic articles or adhesion of a ceramic article to a copper article. The adhesive used in this method is a paste obtained by mixing powdered CuS, powdered $SiO_2$, and powdered $LaCrO_3$, and blending the resultant mixture with an organic tackifier.

The methods of these U.S. patents have the following shortcomings. The method of U.S. Pat. No. 4,163,074 requires that adhesion be carried out under a high temperature of 1400° C.–1500° C. and a high pressure of 15 kg/cm$^2$ in a vacuum or under an argon atmosphere. On the other hand, U.S. Pat. No. 4,269,641 requires the additional step of applying metal Cu powder to the surface of a mixture of CuS powder, $SiO_2$ powder and $LaCrO_3$ powder.

Japanese patent application No. SHO 56(1981)-131683 (U.S. patent application Ser. No. 407,352) covers an invention relating to a method which provides mutual adhesion of ceramic articles of both of silicon nitride by use of calcium fluoride or a mixture of calcium fluoride with kaolin.

These methods have a disadvantage in that they do not always offer sufficient adhesive strength, that they pose some problems regarding practical adoption, and that they provide adhesion only between ceramics of limited materials.

An object of this invention is to provide an adhesive which is superior to all the conventional means described above in adhesive strength, economy, and many other respects and provides adhesion between ceramic articles of nonoxide type materials and oxide type materials as well and a method for adhesion thereof.

SUMMARY OF THE INVENTION

To accomplish the object described above, this invention provides an adhesive which comprises as active components thereof at least one fluoride selected from the group consisting of sodium fluoride and calcium fluoride, and kaolin in an amount of from 0 to about 90% by weight, based on the total weight of the aforementioned at least one fluoride and the aforementioned kaolin, providing that use of calcium fluoride as an active component is excluded where adhesion is provided between two articles of silicon carbide, and a method for adhesion which provides adhesion between two ceramic articles by interposing intimately between the opposed surfaces for union of the aforementioned two ceramic articles an adhesive which comprises as active components thereof at least one fluoride selected from the group consisting of sodium fluoride and calcium fluoride, and kaolin in an amount of from 0 to about 90% by weight, based on the total weight of the aforementioned at least one fluoride and the aforementioned kaolin, and heating the adhesive to a temperature equal to or higher than the decomposition temperature of the fluoride, providing that the case wherein the adhesive having calcium fluoride as an active component thereof is used for interposition between the two articles of silicon carbide is excluded.

The other objects and features of this invention will become apparent from the disclosure of a preferred embodiment of the invention to be made hereinbelow.

DESCRIPTION OF THE PREFERRED EMBODIMENT

To be used effectively as active components for the adhesive of this invention, sodium fluoride and calcium fluoride (hereinafter referred to collectively as "fluorides") each may be of a grade normally available on the market. Although the purity of these fluorides is not specifically defined herein, it is desired to be as high as possible because the adhesive strength of the produced adhesive increases with the purity of the active components used. For practical purpose, the purity is desired to be at least about 95%.

In the adhesive, these fluorides can be advantageously used in their powdered form in which they are normally available in the market. Depending on the particular use for which the adhesive is intended, either of them may be selected or both of them are used in the form of a mixture. As a mixture, the two fluorides may be used in any proportions freely selected to suit the particular use contemplated for the adhesive. Normally, the mixing ratio of the two fluorides is desired to fall in the range of 2:8 to 8:2, preferably 4:6 to 6:4, by weight.

To be used advantageously in conjunction with the aforementioned fluorides for the adhesive of this invention, kaolin may be of any of the grades available on the market. It is not specifically limited by the origin (kind of crude ore), size of crystals, history of production, etc. As regards chemical composition, it may be composed preponderantly of $SiO_2$ and $Al_2O_3$ and may additionally contain $Fe_2O_3$, $TiO_2$, $CaO$, $K_2O$, etc. in small amounts. It tends to contribute to enhancement of the adhesive strength of the produced adhesive in proportion as its purity increases. The high purity of kaolin also can contribute to improving the physical properties of the adhesive layer to be formed between the ceramic articles being joined. When kaolin is combined with the fluoride(s) in an amount of at least about 1% by weight (based on the total amount of fluoride(s) and kaolin), it functions to enhance the adhesive strength of the produced adhesive and/or improve the physical properties of the adhesive layer. This effect of kaolin gradually increases in proportion as the content of kaolin in the adhesive is increased. If kaolin is used excessively, however, there is a possibility that excess kaolin will partially separate and persist in a separated state in the adhesive layer and interfere with the adhesive strength of the adhesive. To avoid this trouble, therefore, kaolin is desired to be used in an amount of not more than about 90% by weight based on the total amount of fluoride(s) and kaolin.

The adhesive of this invention may be used in a form in which sodium fluoride and/or calcium fluoride and kaolin are simply mixed each in a powdered form. Otherwise, it may be used in a form in which the same components are blended with an ordinary vehicle (organic tackifier such as balsam alone or in combination with an organic solvent) and consequently converted into a pasty mixture.

The adhesive of this invention provides ready adhesion between ceramic articles both of a nonoxide type material, between ceramic articles both of an oxide type material, or between one ceramic article of a nonoxide type material and another ceramic article of an oxide type material by a simple procedure which comprises interposing the adhesive intimately between the opposed surfaces for union of the two ceramic articles and heating the adhesive generally to a temperature in the range of about 1000° to 1500° C., preferably about 1050° to 1400° C., without requiring application of any pressure to the adhesive. If the temperature of heating falls short of the lower limit indicated above, the adhesive fails to offer its expected adhesive strength because the fluoride(s) is not decomposed. If the temperature exceeds the upper limit, however, excess heat is wasted without producing any useful effect.

In this case, the temperature at which the adhesive provides effective adhesion can be lowered within the aforementioned temperature range by increasing the proportion of sodium fluoride to the adhesive as a whole.

The adhesive of this invention is characterized particularly by providing adhesion between ceramic articles of nonoxide type materials. In this case, the adhesive strength is normally not less than 400 kg/cm$^2$ and can rise to as high as about 1500 kg/cm$^2$. On the other hand, if, for example, $ZrSiO_4$ is used as the adhesive and adhesion is carried out by the hot press method in such condition that the ceramic material is oxidized, the adhesive strength obtained is only on the order of 0.36 kg/mm$^2$, whereas in using $ZrSiO_4$ to carry out adhesion by the hot press method under a vacuum, the adhesive strength realized is only on the order of 7 kg/cm$^2$. Thus, in any circumstances, the limit of adhesive strength has been 300 kg/cm$^2$, meaning that the present invention provides an improvement of between 30 and 500%. Further, the adhesive of this invention can be applied to adhesion between nonoxide type ceramic articles of large size and complicated shape. It provides powerful adhesion of such ceramic articles. Moreover, the adhesive layer to be formed of the adhesive of this invention between the ceramic articles enjoys chemical stability and possesses degrees of resistance to heat and thermal shocks substantially equal to those of ceramic articles of nonoxide type materials.

The reason for the outstanding effects which are produced by the adhesive of this invention remains yet to be elucidated. A logical explanation of these effects may be offered by the following proposition: The sodium fluoride and/or calcium fluoride in the adhesive of this invention is such that when the adhesive is interposed between the opposed surfaces of two ceramic articles of a nonoxide type material, two ceramic articles of an oxide type material, or one ceramic article of a nonoxide type material and other ceramic article of an oxide type material and then heated to a temperature of not less than the decomposition temperature of the fluoride, the fluoride decomposes with liberation of fluorine gas. It is believed that this liberated fluorine gas will corrode the surfaces of the ceramic materials, while sodium and/or calcium as the decomposition product or the reaction product of sodium and/or calcium with kaolin will penetrate into the corroded surfaces of the ceramic materials and give rise to an adhesive layer of powerful adhesive strength between the ceramic articles being joined. In case the adhesive of this invention incorporates kaolin in conjunction with the fluoride(s), it is believed that this kaolin will activate the sodium or calcium produced by the heating and accelerate the penetration of the ceramic materials by sodium or calcium.

This invention, thus, has established a technique of providing effective adhesive adhesion of ceramic articles in general and, particularly between ceramic articles of nonoxide materials for which none of the conventional techniques has offered any appreciable adhesion. It will, accordingly, contribute to enriching the variety of uses found for ceramic articles of nonoxide type materials and to encouraging further growth of industrial fields which require use of high-temperature refractories.

Examples of the nonoxide type ceramic materials to which the adhesive agent of this invention can be applied are silicon carbide, silicon nitride, and sialon. Here, sialon is a nitride of silicon and aluminum. Examples of the combination of nonoxide type ceramic materials (with the exception of the case in which calcium fluoride is used for mutual adhesion of articles of silicon carbide) are silicon nitride and silicon nitride, silicon nitride and silicon carbide, silicon carbide and silicon carbide, silicon nitride and sialon, silicon carbide and sialon, and sialon and sialon. The adhesive of this invention can be advantageously used as well for adhesion between ceramic articles of the aforementioned nonoxide materials and ceramic articles of oxide type materials such as, for example, alumina, ceramics of mullite, zirconia, cordierite, beryllia, and magnesia and for mutual adhesion of ceramic articles of the aforementioned oxide type materials.

Optionally, three or more ceramic articles of the aforementioned materials may be piled up one on top of another, with the adhesive of this invention interposed between the adjacent ceramic articles. Particularly when one ceramic article of a nonoxide type material and another ceramic article of an oxide type material which involve a large difference of thermal expansion coefficient are to be joined, adhesion by the adhesive of this invention may be effectively obtained by interposing therebetween one more ceramic article of another oxide type material having a thermal expansion coefficient close to the expansion coefficient of the aforementioned ceramic article of nonoxide type material.

By the method of adhesion just mentioned, effective adhesion may be obtained between a ceramic article of a nonoxide type material and a metallic article. To be specific, a metallic article may be joined to a ceramic article of a nonoxide material through the medium of a ceramic article of an oxide type material. In this case, since there is a wide difference of thermal expansion coefficient between the ceramic article of nonoxide material and the metallic article, the ceramic article of oxide type material is interposed therebetween. Use of just one ceramic article of oxide type material will suffice where the thickness of the ceramic article of oxide type material is not more than 5 mm. When the thickness exceeds 5 mm, it is desirable to use at least two ceramic articles of nonoxide type materials of dissimilar thermal expansion coefficients. The metal as referred to herein embraces a wide variety of metals.

These ceramic articles of nonoxide type materials, and oxide type materials and the articles of metallic materials for which the adhesive of this invention are usable are not specifically defined in terms of shape and size. They may be in numerous conceivable shapes such as, for example, plates, pillars, pipes, and solid masses. The ceramic articles to be joined by adhesion may be similar or dissimilar in shape.

The method for adhesion of ceramic articles according to this invention comprises interposing the adhesive of this invention between two articles subjected to adhesion and heating the adhesive to a temperature of not less than the decomposition temperature of sodium fluoride or calcium fluoride. The manner in which the adhesive of this invention is applied to the articles under treatment is variable with the form of the adhesive. When the adhesive is in a powdered form, its application may be effected by simply spraying the adhesive on the opposed surfaces for union of the articles. When the adhesive is in a pasty form, it may be applied in much the same way as any other ordinary adhesive is used. The amount of the adhesive to be applied may be suitably selected in due consideration of such factors as composition of the adhesive actually used, the amount of kaolin contained in the adhesive, heating conditions after the application of the adhesive, and kind and shape of the materials being joined. Although it is not specifically defined herein, it is desired to fall in the range of about 0.01 to 5 g, preferably 0.1 to 1 g, per $cm^2$ of area of adhesion in terms of the weight of the active components used in the adhesive agent of this invention. The heating of the adhesive interposed between the articles under treatment may be effected at the aforementioned temperature, namely, the temperature at which sodium fluoride or calcium fluoride undergoes decomposition with liberation of fluorine gas. This invention does not require use of any means for application of pressure during the heating of the adhesive. Nevertheless, pressure may be slightly applied for the purpose of ensuring intimate contact of the opposed surfaces of the articles to the adhesive layer. The heating generally can be effected easily in air. When there is a possibility that the materials of the ceramic articles will be oxidized by the heating, however, the heating may be carried out in an atmosphere of nitrogen gas. After the heated ceramic articles have been cooled off, they are in fast adhesion.

Now, the present invention will be described more specifically below with reference to working examples.

EXAMPLE 1

Powdered calcium fluoride was spread at a rate of 0.5 g per $cm^2$ of area of adhesion between a plate of silicon nitride and a plate of mullite type ceramic (made by Nippon Chemical Ceramics). The two superposed plates, with the interposed layer of calcium fluoride, were heated in an electric furnace at 1350° C. for 30 minutes.

A test piece of the joined plates, when tested by the three-point bending method under the conditions of 20 mm of span and 0.5 mm/min. of load speed, was found to have 480 kg/$cm^2$ of adhesive strength. When the ruptured surface which the test piece sustained in the aforementioned test was examined visually, the fracture was found to have occurred outside the adhesive layer (in the silicon nitride).

When the another test piece of the joined plates was immersed in a 48% potassium hydroxide solution at 70° C. for 50 hours by way of test for resistance to chemicals, it was found to have absolutely no sign of abnormality in and near the adhesive layer.

Yet another test piece of the joined plates was subjected to a quenching test involving the steps of reheating to 1500° C. and subsequent immersion in water. Absolutely no sign of abnormality was found along the adhesive layer.

EXAMPLE 2

A mixed powder consisting of 50% by weight of sodium fluoride and 50% by weight of kaolin was interposed by spraying at a rate of 0.5 g per cm$^2$ between a plate of silicon nitride and a plate of mullite type ceramic. Similarly to Example 1, the two superposed plates and the interposed mixed powder were heated at 1250° C. for 80 minutes. The two plates were in fast adhesion.

A test specimen of the joined plates was tested for adhesive strength by following the procedure of Example 1. The adhesive strength was 880 kg/cm$^2$.

EXAMPLES 3–9

Adhesives of this invention were prepared by following the procedure of Example 2, except that the mixing ratio of powdered sodium fluoride and powdered kaolin was varied. The adhesives thus produced were used each to provide adhesion between one plate of silicon nitride and one plate of mullite type ceramic. Test pieces of the resultant joined plates were tested for adhesive strength, resistance to chemicals, and resistance to thermal shocks by following the procedure of Example 1. The results were as shown in Table 1.

TABLE 1

| Example No. | Sodium fluoride (% by wt) | Kaolin (% by wt) | Adhesive strength (kg/cm$^2$) | Resistance to chemicals (48% KOH) | Resistance to thermal shocks (quenching) |
|---|---|---|---|---|---|
| 3 | 90 | 10 | 420 | No sign of abnormality | No sign of abnormality |
| 4 | 80 | 20 | 460 | | |
| 5 | 60 | 40 | 550 | | |
| 6 | 40 | 60 | 570 | | |
| 7 | 30 | 70 | 500 | | |
| 8 | 20 | 80 | 480 | | |
| 9 | 10 | 90 | 450 | | |

EXAMPLE 10

The procedure of Example 1 was repeated, except that a plate of sialon was used in the place of the plate of mullite type ceramic. The joined plates were tested for various physical properties. The results were substantially the same as those of Example 1.

EXAMPLES 11–17

The procedures of Examples 3–9 were repeated, except that two plates each of silicon nitride were used instead and that calcium fluoride is used in place of sodium fluoride. The results were as shown in Table 2.

TABLE 2

| Example No. | Calcium fluoride (% by wt) | Kaolin (% by wt) | Adhesive strength (kg/cm$^2$) | Resistance to chemicals (48% KOH) | Resistance to thermal shocks (quenching) |
|---|---|---|---|---|---|
| 11 | 90 | 10 | 575 | No sign of abnormality | No sign of abnormality |
| 12 | 80 | 20 | 732 | | |
| 13 | 60 | 40 | 817 | | |
| 14 | 40 | 60 | 1300 | | |
| 15 | 30 | 70 | 1020 | | |
| 16 | 20 | 80 | 870 | | |
| 17 | 10 | 90 | 515 | | |

EXAMPLE 18

A mixed powder consisting of 10% by weight of calcium fluoride and 90% by weight of sodium fluoride was interposed by spraying at a rate of 0.5 g per cm$^2$ of area of adhesion between one plate of silicon nitride and one plate of mullite type ceramic (Nippon Chemical Ceramics). On the superposed mullite type plate, a copper sheet was placed. They were heated in an electric furnace at 1100° C. for 20 minutes.

A test piece of the resultant joined plates, when tested by the three-point bending method under the conditions of 20 mm of span and 0.5 mm/min. of load speed, was found to have 870 kg/cm$^2$ of adhesive strength. When the fractured surface sustained by the test piece during the aforementioned test was examined visually, fracture was found to have occurred outside the adhesive layer (in the mullite ceramic plate).

When another test piece of the joined plates was immersed in an aqueous 48% potassium hydroxide solution at 70° C. for 70 hours by way of test for resistance to chemicals, it was found to have absolutely no mark of any abnormality in and near the adhesive layer.

When yet another test piece of the joined plates was subjected to a quenching test involving the steps of reheating to 1100° C. and sudden cooling in air to determine the resistance to thermal shocks, absolutely no sign of abnormality was detected in and near the adhesive layer.

EXAMPLES 19–25

Adhesives of the present invention were prepared by following the procedure of Example 18, except that the mixing ratio of sodium fluoride and calcium fluoride was varied. These adhesives were used each to provide adhesion between one plate of silicon nitride and one plate of mullite type ceramic.

Test pieces of the resultant joined plates were tested for adhesive strength, resistance to chemicals, and resistance to thermal shocks by following the procedure of Example 18. The results were as shown in Table 3 below.

TABLE 3

| Example No. | Calcium fluoride (% by wt) | Sodium fluoride (% by wt) | Adhesive strength (kg/cm$^2$) | Resistance to chemicals (48% KOH) | Resistance to thermal shocks (quenching) |
|---|---|---|---|---|---|
| 19 | 20 | 80 | 380 | No sign of abnormality | No sign of abnormality |
| 20 | 30 | 70 | 405 | | |
| 21 | 40 | 60 | 420 | | |
| 22 | 50 | 50 | 410 | | |
| 23 | 60 | 40 | 450 | | |
| 24 | 70 | 30 | 470 | | |
| 25 | 80 | 20 | 420 | | |

EXAMPLE 26

A mixed powder consisting of 70% by weight of calcium fluoride and 30% by weight of sodium fluoride was interposed by spraying at a rate of 0.5 g per cm$^2$ of area of adhesion between two plates of silicon nitride. By following the procedure of Example 18, the superposed plates were heated at 1100° C. for 20 minutes to obtain joined plates.

A test piece of the joined plates was found by test to have 420 kg/cm$^2$ of adhesive strength. When other test pieces of the joined plates were tested for resistance to chemicals and resistance to thermal shocks by following the procedure of Example 18, they were found to have absolutely no sign of abnormality.

EXAMPLES 27-32

Adhesives of this invention were prepared by following the procedure of Example 26, except that the mixing ratio of calcium fluoride and sodium fluoride was varied. These adhesives were used each to provide adhesion of two plates of silicon nitride. When test pieces of the resultant joined plates were tested for adhesive strength, resistance to chemicals, and resistance to thermal shocks by following the procedure of Example 18, there were obtained the results which are shown in Table 4 below.

TABLE 4

| Example No. | Calcium fluoride (% by wt) | Sodium fluoride (% by wt) | Adhesive strength (kg/cm$^2$) | Resistance to chemicals (48% KOH) | Resistance to thermal shocks (quenching) |
|---|---|---|---|---|---|
| 27 | 20 | 80 | 380 | No sign of abnormality | No sign of abnormality |
| 28 | 30 | 70 | 405 | " | " |
| 29 | 40 | 60 | 450 | " | " |
| 30 | 50 | 50 | 490 | | |
| 31 | 60 | 40 | 520 | | |
| 32 | 80 | 20 | 480 | | |

What is claimed is:

1. A method for the adhesion of two ceramic articles both formed of silicon nitride, said method comprising interposing between said two ceramic articles an adhesive comprising as active components 40% to 30% by weight of calcium fluoride and 60% to 70% by weight of kaolin, and heating said adhesive to a temperature in the range of from about 1000° C. to about 1500° C. thereby allowing said adhesive to have adhesive strength of not less than 1000 kg/cm$^2$.

2. An adhesive for two ceramic articles both formed of silicon nitride, said adhesive comprising as active components 40% to 30% by weight of calcium fluoride and 60% to 70% by weight of kaolin and having an adhesive strength of not less than 1000 kg/cm$^2$.

* * * * *